United States Patent
Sanderson

(10) Patent No.: US 10,508,752 B2
(45) Date of Patent: Dec. 17, 2019

(54) VALVE ACTUATOR INDICATOR ARRANGEMENT

(71) Applicant: LB Bentley Limited, Stroud, Gloucestershire (GB)

(72) Inventor: Bryan Sanderson, Stroud (GB)

(73) Assignee: LB Bentley Limited, Stroud, Gloucestershi (GB)

( * ) Notice: Subject to any disclaimer, the term of this patent is extended or adjusted under 35 U.S.C. 154(b) by 0 days.

(21) Appl. No.: 15/775,629

(22) PCT Filed: Oct. 19, 2016

(86) PCT No.: PCT/GB2016/053244
§ 371 (c)(1),
(2) Date: May 11, 2018

(87) PCT Pub. No.: WO2017/085451
PCT Pub. Date: May 26, 2017

(65) Prior Publication Data
US 2018/0372240 A1    Dec. 27, 2018

(30) Foreign Application Priority Data

Nov. 20, 2015 (GB) .................................. 1520486.0

(51) Int. Cl.
*F16K 37/00* (2006.01)
*G01L 7/16* (2006.01)

(52) U.S. Cl.
CPC ...... *F16K 37/0008* (2013.01); *F16K 37/0016* (2013.01); *G01L 7/166* (2013.01); *Y10T 137/8275* (2015.04); *Y10T 137/8292* (2015.04)

(58) Field of Classification Search
CPC ......... Y10T 137/8275; Y10T 137/8292; F16K 37/0008; F16K 37/0016; G01L 7/166
See application file for complete search history.

(56) References Cited

U.S. PATENT DOCUMENTS 3,363,601 A * 1/1968 Mills, III ............ F16K 37/0008
                                                    116/277
4,548,235 A * 10/1985 Rosaen ................. F16K 15/063
                                                    116/271

(Continued)

FOREIGN PATENT DOCUMENTS

DE       94 21 279 U1    8/1995
WO    2008139660 A1    11/2008

OTHER PUBLICATIONS

International Search Report and Written Opinion for International Patent Application No. PCT/GB2016/053244 dated Jan. 31, 2017.

*Primary Examiner* — Atif H Chaudry
(74) *Attorney, Agent, or Firm* — Andrus Intellectual Property Law, LLP

(57) ABSTRACT

A valve actuator is described that comprises a piston movable within a cylinder, an indicator pin support member movable with the piston, and an indicator pin attached to the support member and extending through an opening provided in a housing, wherein the indicator pin includes an attachment region held captive to the support member, the attachment region extending through an arcuate slot formed in the support member. Also described is a valve incorporating such an actuator.

10 Claims, 2 Drawing Sheets

(56) References Cited

U.S. PATENT DOCUMENTS

| | | | |
|---|---|---|---|
| 4,635,901 A * | 1/1987 | Pond | F16K 37/0008 |
| | | | 116/285 |
| 4,721,284 A | 1/1988 | Bankard | |
| 2011/0297255 A1 * | 12/2011 | Weingarten | F16K 17/0453 |
| | | | 137/535 |
| 2013/0146793 A1 * | 6/2013 | Gustafson | E21B 33/062 |
| | | | 251/1.3 |
| 2014/0166131 A1 | 6/2014 | Adams et al. | |

\* cited by examiner

VALVE ACTUATOR INDICATOR ARRANGEMENT

CROSS-REFERENCE TO RELATED APPLICATIONS

This application claims priority to PCT/GB2016/053244, filed Oct. 19, 2016, and published in English on May 26, 2017, as publication number WO 2017/085451 A1, which claims priority to GB Application No. 1520486.0, filed Nov. 20, 2015, the disclosures of which are incorporated herein by reference.

FIELD

This invention relates to a valve actuator, and in particular to a hydraulically or pneumatically actuable valve actuator including an indicator arrangement operable to provide a visible indication of the position of an associated valve. The invention also relates to a valve including such an actuator.

BACKGROUND

Hydraulically operable valve actuators of a range of forms are well known. One known form of actuator comprises a piston movable within a cylinder, the piston being spring biased towards one position, and being movable to another position upon the application of fluid under pressure to a chamber of the cylinder. It will be appreciated that by coupling a valve member of an associated valve to the piston, movement of the piston can result in accompanying movement of the valve member, opening or closing the valve.

In order to provide a visible indication of the valve position, it is known to provide the piston with a rod movable therewith, the rod carrying a spring abutment member with which the biasing spring engages to bias the piston towards the rest position mentioned hereinbefore. One or more indicator pins are rigidly secured to the spring abutment member, the pins extending through openings formed in a housing. As the pins are rigidly secured to the spring abutment member which moves with the rod and piston, it will be appreciated that the distance by which the pins project from the housing at any given time provide an indication of the position of the actuator and valve at that time.

Whilst the arrangement described hereinbefore permits an indication to be made of the valve position, assembly of the actuator is time consuming as the spring abutment member must be accurately positioned in order to ensure that the pins align with the openings formed in the housing. Slight misalignment therebetween may impede movement of the spring abutment member and/or result in increased wear or leakage past the pins and seals located between the pins and the housing.

SUMMARY

It is an object of the invention to provide an arrangement in which at least some of the disadvantages associated with known arrangements are overcome or are of reduced impact.

According to the present invention there is provided a valve actuator comprising a piston moveable within a cylinder, an indicator pin support member movable with the piston, and at least one indicator pin attached to the support member and extending through an opening provided in a housing, wherein the indicator pin includes an attachment region held captive to the support member, the attachment region extending through an arcuate slot formed in the support member.

It will be appreciated that the manner in which the indicator pin is attached to the support member accommodates limited angular misalignment of the support member relative to the housing whilst enabling the indicator pin to be freely movable within the opening. The risk of movement being impeded or increased wear and/or leakage is thus reduced.

Conveniently, two indicator pins are provided. Each indicator pin conveniently includes an attachment region received within a respective arcuate slot as mentioned hereinbefore.

The or each arcuate slot conveniently includes a radially extending section, for example extending to an inner periphery of the support member, to allow the introduction of the attachment region of the associated indicator pin into the arcuate slot. Alternatively, the radially extending section may extend to an outer periphery of the support member.

In an alternative arrangement, the or each pin may be secured to the support member by a threaded a threaded peg and nut arrangement, or by a plain peg and grab washer arrangement.

The piston is conveniently spring biased towards a rest position, and the spring providing the biasing load conveniently engages a spring abutment member associated with the piston, the spring abutment member preferably also serving as the support member.

The invention also relates to a valve arrangement comprising a valve member movable relative to a seat, the valve member being secured to the piston of an actuator of the type set out hereinbefore for movement therewith.

The valve member may comprise the gate valve member of a slab gate type valve.

It will be appreciated that in such an arrangement, the indicator pin provides an indication of the valve position.

BRIEF DESCRIPTION OF THE DRAWINGS

The invention will further be described, by way of example, with reference to the accompanying drawings, in which.

DETAILED DESCRIPTION OF THE DRAWINGS

Figure 2:
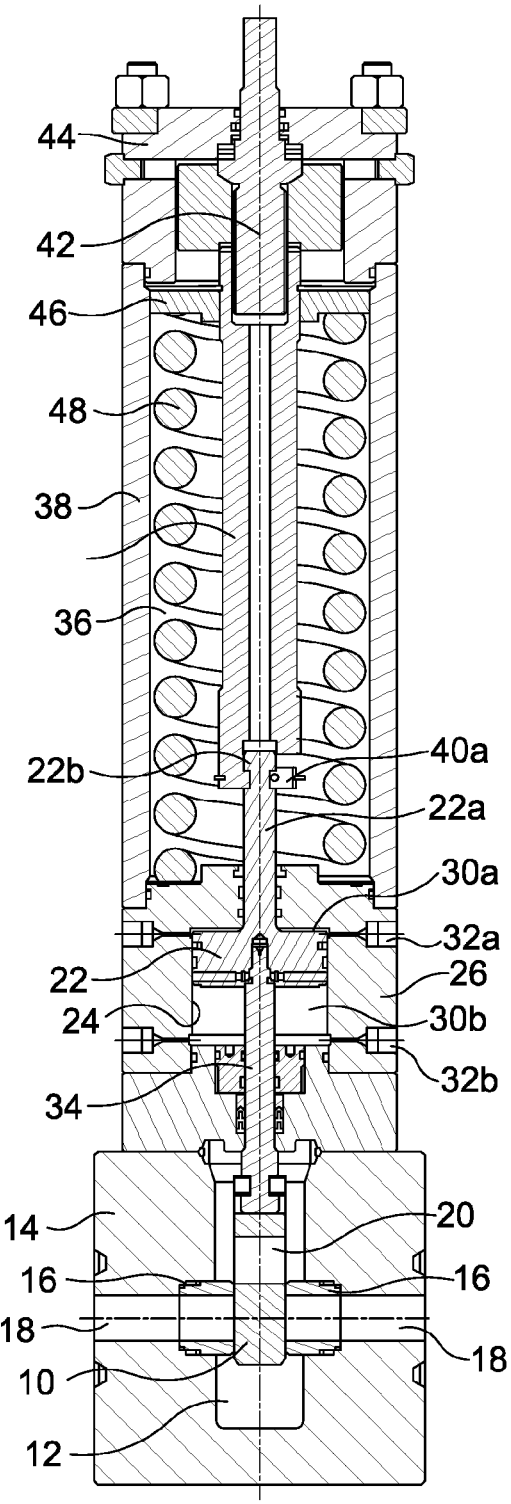
FIG. 2 is another sectional view of the actuator and the associated valve.

Referring to the accompanying drawings, a valve and an associated actuator are illustrated. The valve takes the form of a slab gate valve comprising a slab gate valve member 10 movable within a chamber 12 formed in a valve housing 14. As illustrated in FIG. 2, the valve housing 14 carries a pair of tubular seat members 16 that bear against opposing side surfaces of the valve member 10, the seat members 16 being aligned with flow passages 18 formed in the valve housing 14. The valve member 10 includes an opening 20 extending between the surfaces thereof with which the seat members 16 engage. In the position illustrated, the valve member 10 occupies a position in which the opening 20 is not aligned with the internal passages of the seat members 16. Accordingly, the valve is closed, fluid flow between the passages 18 not being permitted. From the position shown, movement of the valve member 10 in the downward direction (in the orientation illustrated) results in partial or full registration of the opening 20 with the passages defined by the seat members 16, depending upon the distance through which the valve member 10 is moved, and hence in fluid flow between the passages 18 being permitted. The valve thus occupies an open position.

The actuator shown in the accompanying drawings comprises a piston 22 slidable within a cylinder 24 formed in a piston housing 26 forming part of a multi-part actuator housing. The piston 22 divides the cylinder 24 into a pair of chambers 30a, 30b, and the piston housing 26 is formed with ports 32a, 32b communicating, respectively, with the chambers 30a, 30b to allow control over the pressures applied to the chambers 30a, 30b.

As illustrated, a connecting rod 34 is secured to the piston 22, for example being in threaded engagement therewith, the rod 34 projecting from the piston housing 26 into the chamber 12 formed in the valve housing 14, an end part of the rod 34 remote from the piston 22 being connected to the valve member 10. As shown, this connection conveniently takes the form of a re-entrant groove formed in the valve member 10 in which a head formed at the end of the rod 34 is located. Whilst this represents one technique by which the piston 22 and valve member 10 may be connected to one another, it will be appreciated that a number of other techniques are possible without departing from the scope of the invention.

The piston 22 includes an integral rod section 22a the extends through an opening formed in the piston housing 26 in a substantially fluid tight manner, the section 22a extending into a spring chamber 36 defined by another part 38 of the actuator housing.

Located within the spring chamber 36, and secured to the end of the section 22a is a rod 40. The connection between the rod 40 and the end of the section 22a may take a wide range of forms. In the arrangement shown, the rod 40 is shaped to define a pair of spaced fingers 40a between which a part of the section 22a extends, a head 22b located at the end of the section 22a being located above the fingers 40a.

The rod 40, in the arrangement illustrated, is of hollow, tubular form, an upper end of the tubular passage of the rod 40 being of enlarged diameter, and receiving a stub 42 located upon another part 44 of the actuator housing, the interaction between the stub 42 and the rod 40 guiding the rod 40 for movement. Whilst the rod 40 is shown as being of hollow tubular form, it will be appreciated that this need not always be the case.

Secured to the outer surface of the rod 40 is a spring abutment member 46, a spring 48 being engaged between the spring abutment member 46 and a surface of the piston housing 26 to apply a biasing load to the rod 40, and hence to the piston 22 and the valve member 10 urging the valve member 10 towards the illustrated, closed position.

The housing part 44 includes a pair of openings 50 through which respective indicator pins 52 extend, seals being provided between the indicator pins 52 and the housing part 44. Each indicator pin 52 is connected, at an attachment region thereof at its end located within the spring chamber 36, to the spring abutment member 46. In this arrangement, the spring abutment member 46 thus also serves as an indicator member support member. However, this need not always be the case, and arrangements are possible in which the indicator member support member does not also act as a spring abutment.

Figure 3:
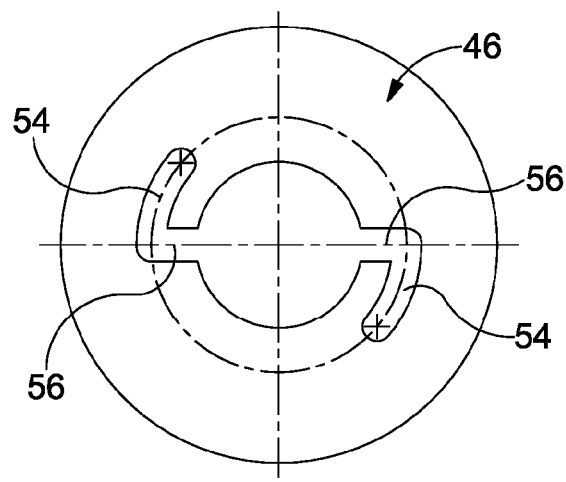
FIGS. 3, 4 and 5 are views illustrating part of the actuator of the embodiment shown in FIGS. 1 and 2.
Figure 4:
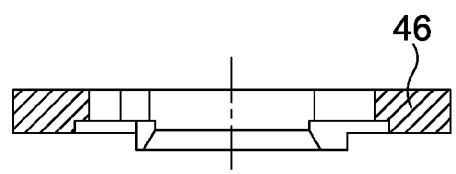
Figure 5:
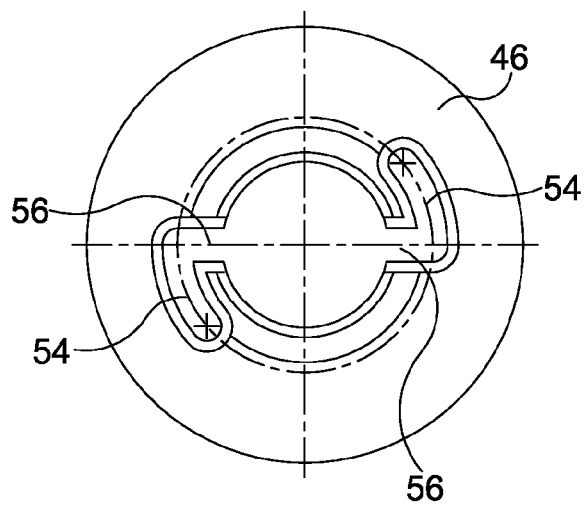

As shown in FIGS. 3 and 5, the spring abutment member 46 is formed with a pair of arcuate slots 54. Each arcuate slot 54, in the arrangement shown, intersects with a respective radially extending slot 56, extending from the inner periphery of the spring abutment member 46.

Figure 1:
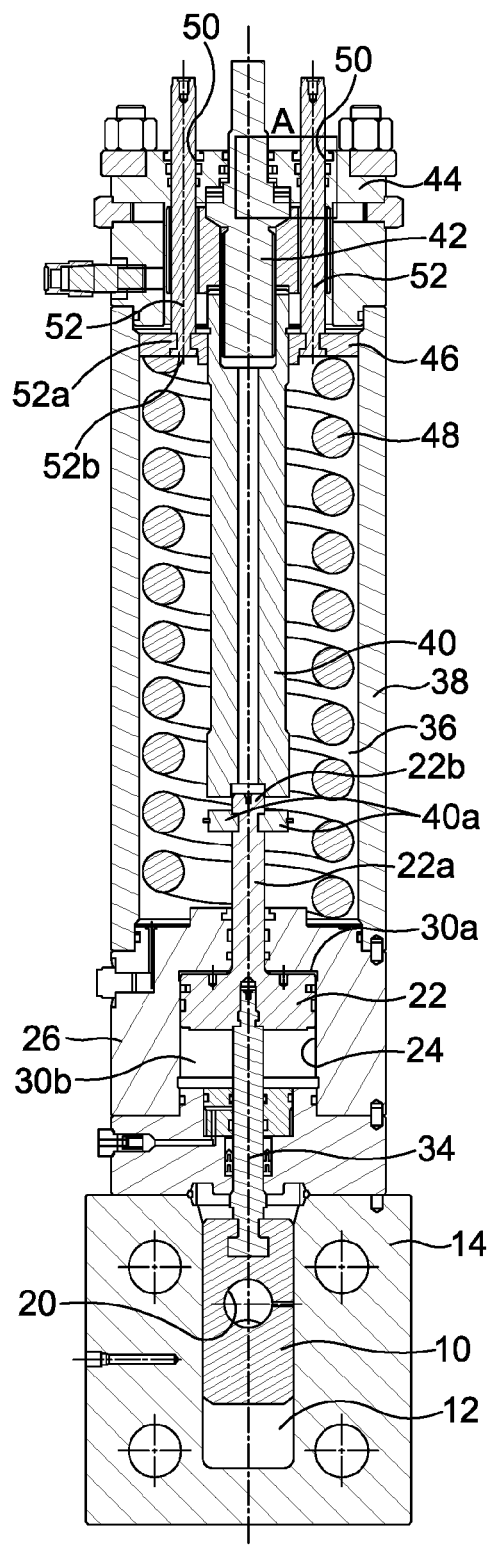
FIG. 1 is a sectional view illustrating an actuator and an associated valve in accordance with an embodiment of the invention.

The attachment region at the end part of each indicator pin 52 located within the spring chamber 36 is shaped to be of stepped diameter, defining an annular recess 52a and a head 52b. As shown in FIG. 1, the recess 52a is located within the respective arcuate slot 54, with the head 52b located to the side of the spring abutment member 46 remote from the housing part 44. It will be appreciated that the connection between each pin 52 and the spring abutment member 46 is such that the pins 52 are held captive to the spring abutment member 46, axial movement of the spring abutment member 46 in both axial directions being transmitted to the pins 52. However, as the pins 52 are connected to the spring abutment member 46 by way of the arcuate slots 54, the slots 54 accommodate angular misalignment between the spring abutment member 46 and the housing part 44.

It will be appreciated that assembly of the pins 52 to the spring abutment member 46 involves inserting the reduced diameter parts of the pins 52 that define the annular recesses 52a into the radial slots 56, and through the radial slots 56 into the respective arcuate slot 54 prior to mounting the spring abutment member 46 onto the rod 40.

Whilst the provision of radial slots 56 represents one convenient technique to allow assembly, other arrangements are possible. By way of example, a screw threaded peg and nut or a plain peg with a grab washer could be utilised to secure the pin 52 to the arcuate slot 54, the peg being secured to or extending from the pin 52, without requiring a radial slot 56 to be present to allow assembly.

During assembly of the actuator, the pins 52 (once connected to the spring abutment member 46) are introduced into the openings 50 formed in the housing part 44. During subsequent assembly steps, should any angular movement of the spring abutment member 46 occur, this can be accommodated by movement of the ends of the pins 52 within the arcuate slots 54, thus during subsequent use, the risk of the pins 52 binding with the housing part 44, potentially impeding movement or resulting in increased wear, is reduced.

In use, in the position shown the valve member 10 occupies its closed position. In this position, the indicator pins 52 project from the housing part 44 by a relatively large distance. If it is desired to move the valve to its closed position, fluid under pressure is applied to the port 32a and chamber 30a, urging the piston 22 to move in the downward direction, this movement being accompanied by corresponding movement of the valve member 10, the movement being against the action of the spring 48 and resulting in compression thereof. As the movement results in movement of the spring abutment member 46 and pins 52, it will be appreciated that the change in the distance by which the pins 52 project from the housing part 44 provides an indication of the movement of the valve member 10 to, or towards, its open position. During this movement, the chamber 30b is vented.

To return the valve member 10 to the closed position, the pressure within the chamber 30a is reduced, the load applied by the spring 48 returning the actuator and valve to the position shown. If desired, high pressure fluid may be applied to the chamber 30b to aid this movement, although it is not envisaged that this will normally be required.

Whilst the description hereinbefore is of one embodiment of the invention, it will be appreciated that the invention is not restricted to the arrangement shown. Rather, a range of modifications and alterations may be made thereto without departing from the scope of the invention. By way of example, the manner in which the various components are secured to one another may be changed. Additionally, the actuator may be used in operating valves of a range of other designs, both in the form of slab gate valves and in the form of other types of valve.

The invention claimed is:

1. A valve actuator comprising:
a piston moveable within a cylinder,
an indicator pin support member movable with the piston, and
an indicator pin attached to the support member and extending through an opening provided in a housing,
wherein the indicator pin includes an attachment region held captive to the support member, the attachment region extending through an arcuate slot formed in the support member, wherein the piston is spring biased toward a rest position, the spring providing a biasing load engaging a spring abutment member associated with the piston, the spring abutment member also serving as the support member.

2. An actuator according to claim 1, wherein two indicator pins are provided.

3. An actuator according to claim 2, wherein each indicator pin includes an attachment region received within a respective arcuate slot.

4. An actuator according to claim 1, wherein the arcuate slot intersects a radially extending slot.

5. An actuator according to claim 4, wherein the radially extending slot extends to an inner periphery of the support member.

6. An actuator according to claim 4, wherein the radially extending slot extends to an outer periphery of the support member.

7. An actuator according to claim 1, wherein the pin is held captive to the associated arcuate slot by a threaded peg and nut.

8. An actuator according to claim 1, wherein the pin is held captive to the associated arcuate slot by a peg and grab washer.

9. A valve arrangement comprising:
a valve member movable relative to a seat, the valve member being secured to a piston of an actuator for movement therewith, the actuator comprising the piston moveable within a cylinder,
an indicator pin support member movable with the piston, and
an indicator pin attached to the support member and extending through an opening provided in a housing,
wherein the indicator pin includes an attachment region held captive to the support member, the attachment region extending through an arcuate slot formed in the support member, wherein the piston is spring biased towards a rest position, the spring providing the biasing load engaging a spring abutment member associated with the piston, the spring abutment member also serving as the support member.

10. A valve arrangement according to claim 9, wherein the valve member comprises the gate valve member of a slab gate type valve.

* * * * *